Oct. 14, 1958 E. P. WIGNER ET AL 2,856,339
NEUTRONIC REACTORS
Filed May 28, 1945 9 Sheets-Sheet 1

Witnesses:
Hubert E. Metcalf
Richard E. Burn

Inventors:
Eugene P. Wigner
Gale J. Young
By Robert A. [illegible]
Attorney.

Oct. 14, 1958 — E. P. WIGNER ET AL — 2,856,339
NEUTRONIC REACTORS
Filed May 28, 1945 — 9 Sheets-Sheet 2

Witnesses:
Herbert E. Metcalf
Richard E. Burn

Inventors:
Eugene P. Wigner
Gale J. Young
By: Robert A. Conender
Attorney

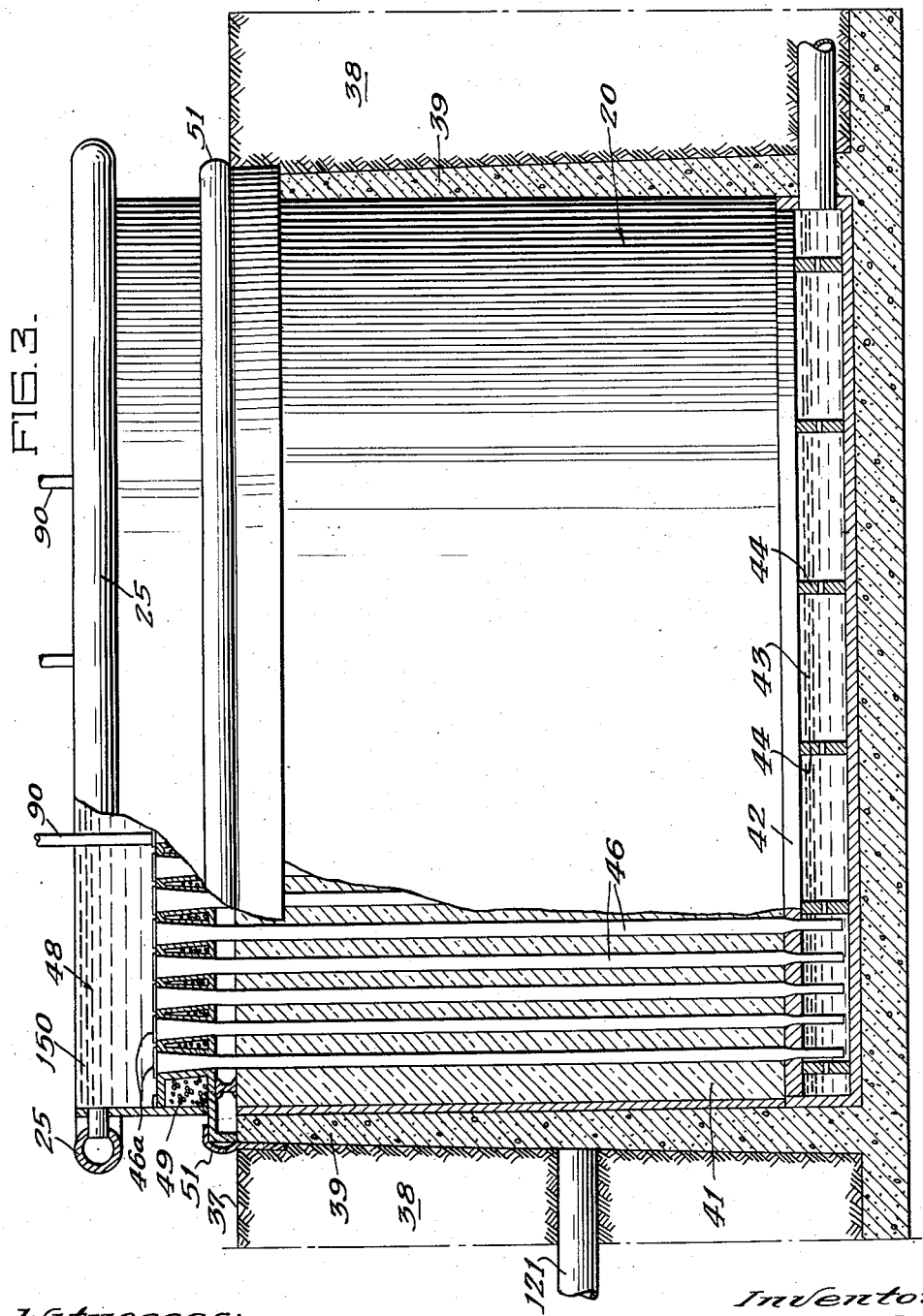

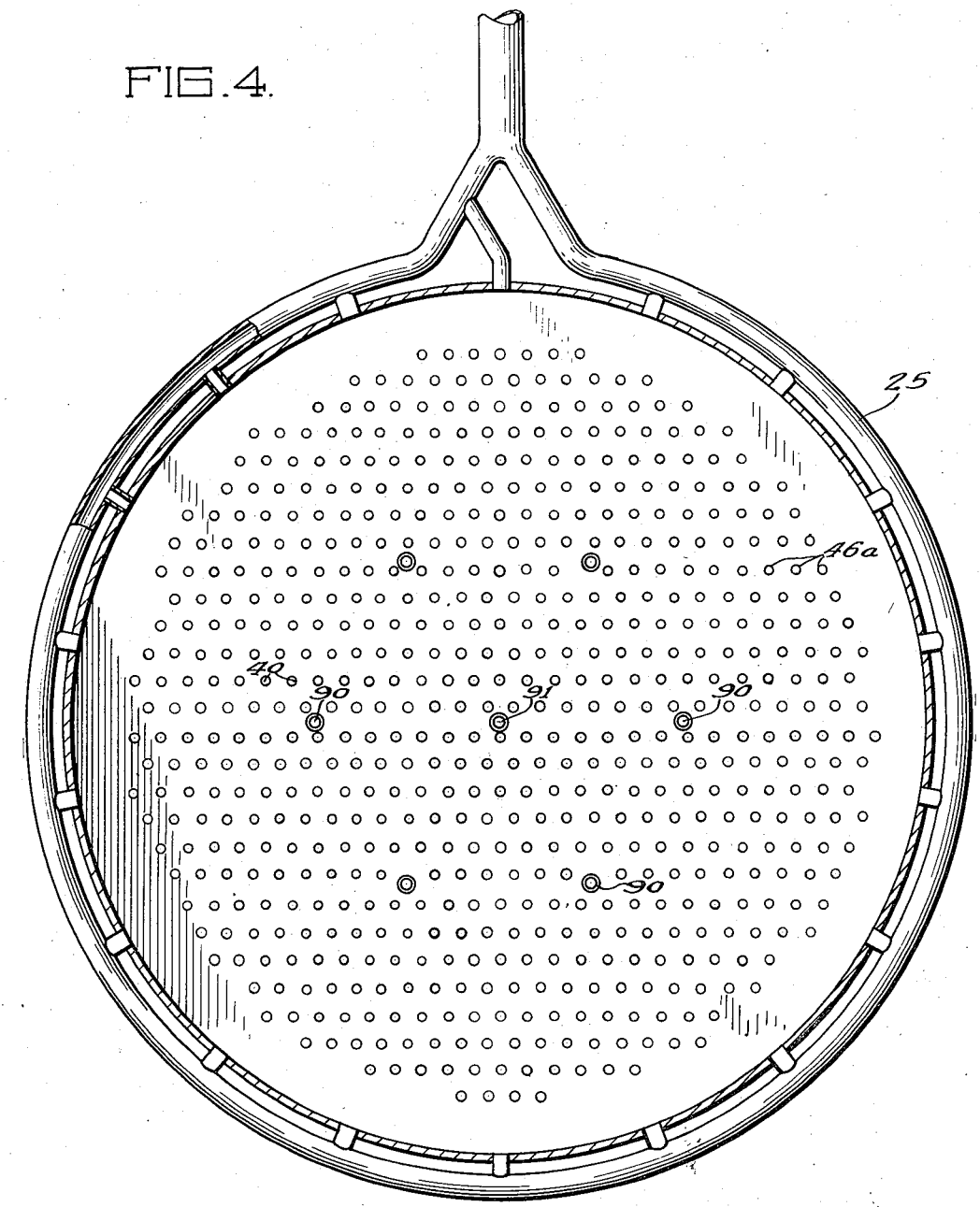

Oct. 14, 1958 E. P. WIGNER ET AL 2,856,339
NEUTRONIC REACTORS
Filed May 28, 1945 9 Sheets-Sheet 5

Witnesses:
Herbert E. Metcalf
Richard E. Burn

Inventors:
Eugene P. Wigner
Gale J. Young
By:
Robert A. [signature]
Attorney

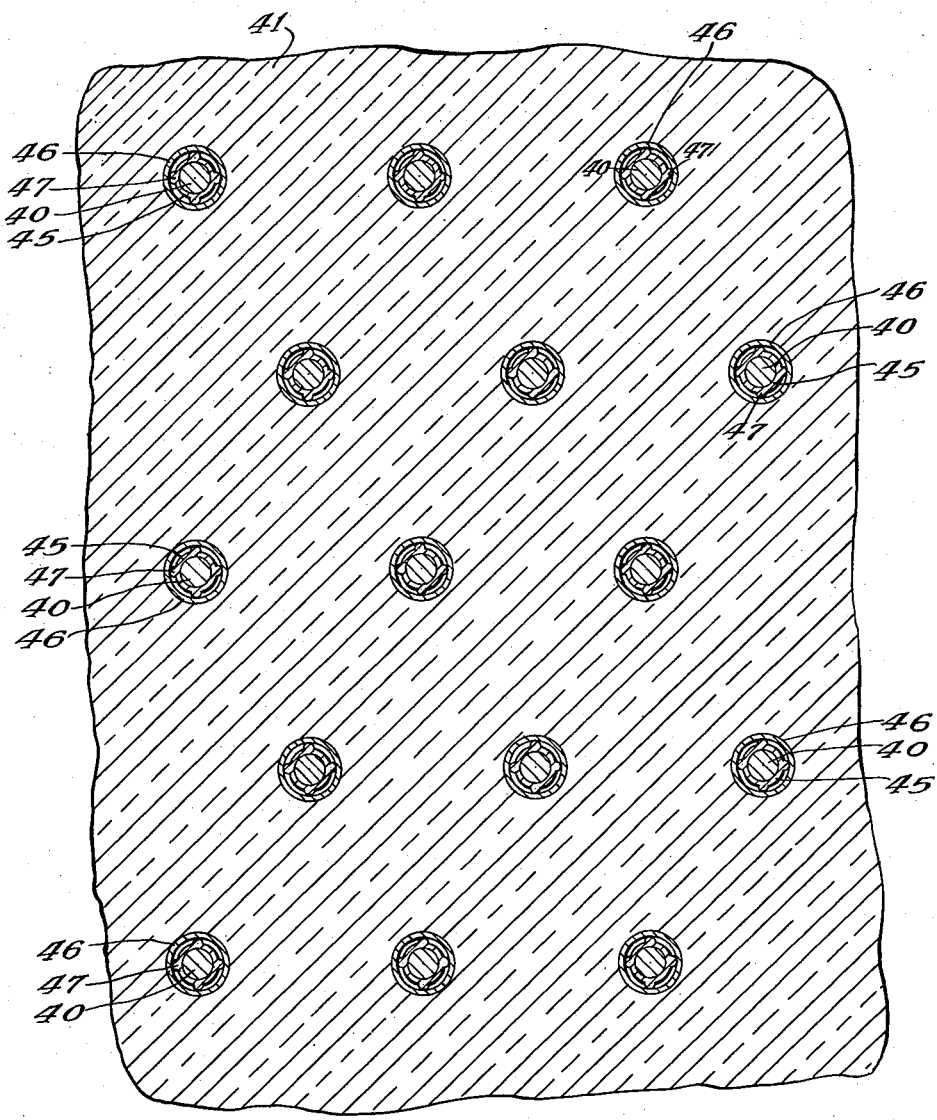

Oct. 14, 1958

E. P. WIGNER ET AL 2,856,339

NEUTRONIC REACTORS

Filed May 28, 1945

Witnesses:
Herbert E. Metcalf
Richard E. Burn

Inventors:
Eugene P. Wigner
Gale J. Young
By:
Robert A. Lavender
Attorney.

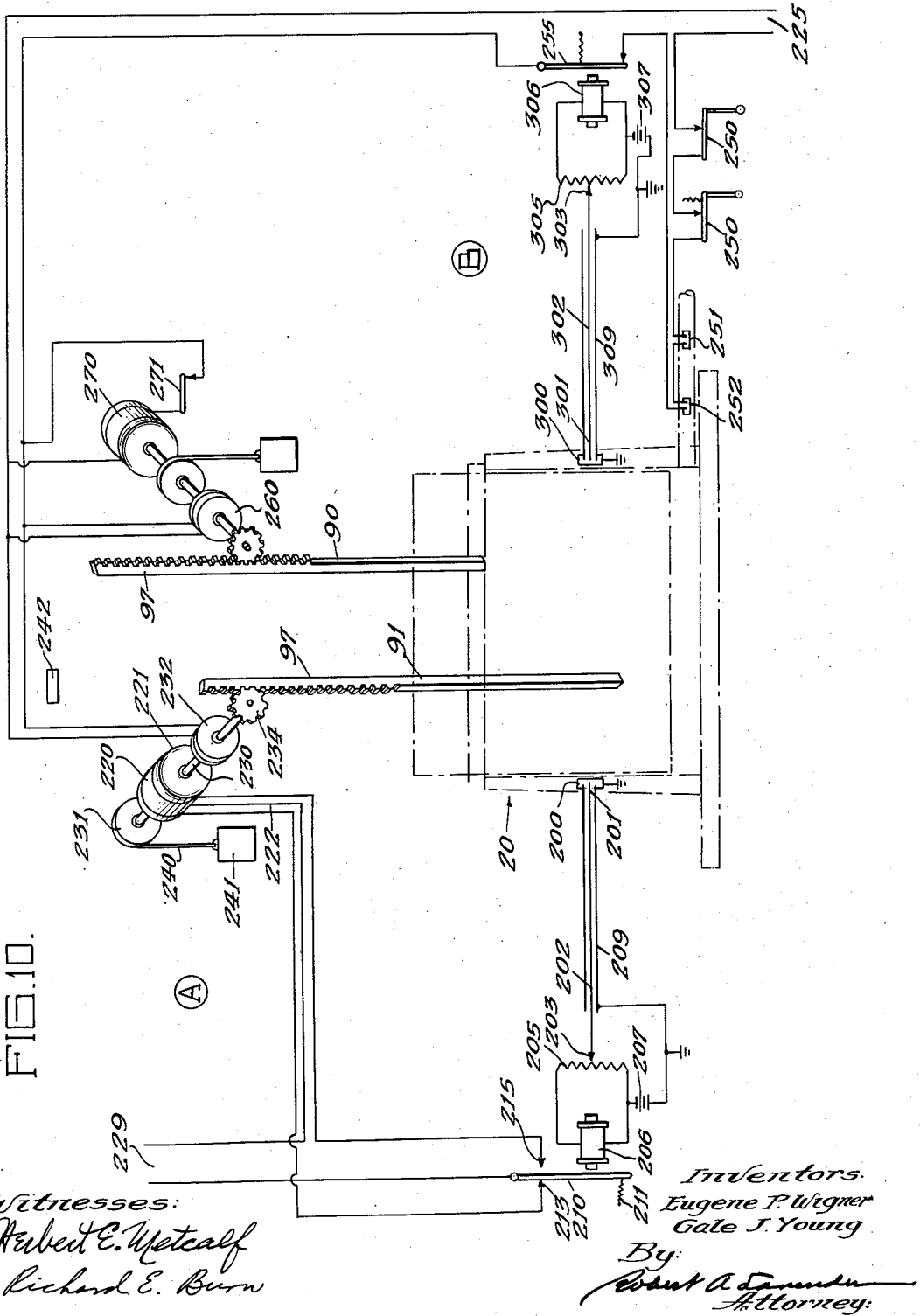

United States Patent Office 2,856,339
Patented Oct. 14, 1958

2,856,339

NEUTRONIC REACTORS

Eugene P. Wigner and Gale J. Young, Chicago, Ill., assignors to the United States of America as represented by the United States Atomic Energy Commission Application May 28, 1945, Serial No. 596,219

2 Claims. (Cl. 204—193.2)

The present invention relates to the removal of bodies of fissionable material from a neutron chain reacting system, also referred to as a neutronic reactor system. In the form of the invention shown bodies of uranium are disposed in passages arranged in a graphite moderator, the said bodies having a cross sectional area less than the cross sectional area of the passages in which they are disposed so as to provide spaces around the bodies through which the coolant can pass. The bodies are removable from the reactor through openings in the passages at one side of the reactor, the openings normally being submerged in water.

As a result of the chain reaction, when $U^{238}$ is present (as in natural uranium), transuranic element $94^{239}$, known as plutonium, is produced. This material is fissionable and is valuable when added to natural uranium for use in a chain reacting system, as a fissionable body in lieu of or conjunction with natural uranium.

Natural uranium contains both uranium isotopes $U^{235}$ and $U^{238}$ in the ratio of 1 to 139. The $U^{235}$ is the isotope fissionable by slow neutrons.

When fission occurs in the $U^{235}$ isotope, the following reaction takes place:

$$_{92}U^{235} + \text{neutron } A + B + \text{about 2 neutrons (average)}$$

where "A" represents "light" fission fragments having atomic masses ranging from 83 to 99 inclusive and atomic numbers from 34 to 45 inclusive; for example, Br, Kr, Rb, Sr, Y, Zr, Cb, Mo, Ma, Ru, and Rh; and "B" represents "heavy" fission fragments having atomic masses ranging from 127 to 141 inclusive, and atomic numbers from 51 to 60 inclusive; for example, Sb, Te, I, Xe, Cs, Ba, La, Ce, Pr, and Nd. The elements resulting from the fissions are unstable and radioactive, with half-lives varying in length in accordance with the element formed.

The absorption of thermal or resonance nuetrons by the $U^{238}$ isotope gives rise to the conversion of $U^{238}$ to $U^{239}$ which ultimately decays to transuranic element $94^{239}$. The reaction is as follows:

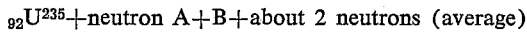

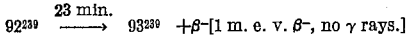

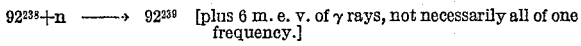

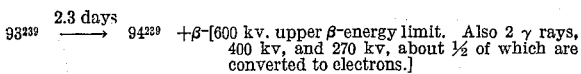

Most of the neutrons arising from the fission process are set free with the very high energy of above one million electron volts average and are therefore not in condition to be utilized efficiently to create new thermal neutron fissions in a fissionable body such as $U^{235}$ when it is mixed with a considerable quantity of $U^{238}$, particularly as in the case of natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross section of $U^{235}$, to produce fission, is a great deal more than the simple capture cross section of $U^{238}$; so that under the stated circumstances the fast fission neutrons, after they are created, must be slowed down to thermal energies before they are most effective to produce fresh fisssion by reaction with additional $U^{235}$ atoms. If a system can be made in which neutrons are slowed down without excessive absorption until they reach thermal energies and then mostly enter into uranium rather than into any other element, a self-sustaining nuclear chain reaction can be obtained, even with natural uranium. Light elements, such as deuterium, beryllium, oxygen or carbon, the latter in the form of graphite, can be used as slowing agents. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron capture by the hydrogen nucleus. Carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon. Deuterium while more expensive is especially valuable because of its low absorption of neutrons and its compounds such as deuterium oxide have been used with very effective results.

However, in order for the premise to be fulfilled that the fast fission neutrons be slowed to thermal energies in a slowing medium without too large an absorption in the $U^{238}$ isotope of the uranium, certain types of physical structure should be utilized for the most efficient reproduciton of neutrons, since unless precautions are taken to reduce various neutron losses and thus to conserve neutrons for the chain reaction the rate of neutron reproduction may be lowered and in certain cases lowered to a degree such that a self-sustaining system is not attained.

The ratio of the number of fast neutrons produced by the fissions, to the original number of fast neutrons creating the fissions, in a system of infinite size using specific materials is called the reproduction or multiplication factor of the system and is denoted by the symbol K. If K can be made sufficiently greater than unity to create a net gain in neutrons and the system made sufficiently large so that this gain is not entirely lost by leakage from the exterior surface of the system, then a self-sustaining chain reacting system can be built to produce power by nuclear fission of natural uranium. The neutron reproduction ratio, r, in a system of finite size differs from K by the leakage factor and by localized neutron absorbers such as control rods, and must be sufficiently greater than unity to permit the neutron density to rise exponentially. Such a rise will continue indefinitely if not controlled at a desired density corresponding to a desired power output.

During the interchange of neutrons in a system comprising bodies of uranium of any size in a slowing medium, neutrons may be lost in four ways, by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities, referred to later. Neutron resonance absorption in uranium may take place either on the surface of the uranium bodies, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have those energies, called resonance energies as explained above, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for slowing materials, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of slowing material (i. e. the amount of slowing medium remaining unchanged) will reduce surface absorption, and any such reduction in surface absorption will release neutrons to enter directly into the chain reaction, i. e., will increase the number of neutrons available for further slowing and thus for reaction with $U^{235}$ to produce fission.

For a given ratio of slowing material to uranium, surface resonance absorption losses of neutrons in the uranium can be reduced by a large factor from the losses occurring in a mixture of fine uranium particles and a slowing medium, if the uranium is aggregated into substantial masses in which the mean radius of the aggregates is at least 0.25 centimeter for natural uranium metal and when the mean spatial radius of the bodies is at least 0.75 centimeter for the oxide of natural uranium ($UO_2$). Proportionate minimums exist for other uranium compounds the exact minimum value being dependent upon the uranium content and the density of the product. An important gain is thus made in the number of neutrons made directly available for the chain reaction. A similar gain is made when the uranium has more than the natural content of fissionable material. Where a maximum K factor is to be desired we place the uranium in the system in the form of spaced uranium masses or bodies of substantial size, preferably either of metal, oxide, carbide, or other compound or combinations thereof. The uranium bodies can be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite or other moderator with at least either a roughly uniform spacing or with a roughly systematic non-uniform spacing, and are at least roughly uniform in size and shape or are systematic in variations of size or shape to produce a volume pattern conforming to a roughly symmetrical system. If the pattern is a repeating or rather exactly regular one, a system embodying it may be conveniently described as a lattice structure. Optimum conditions are obtained with natural uranium by using a lattice of metal spheres.

The number of neutrons made directly available to the chain reaction by aggregating the uranium into separate bodies spaced through the slowing medium is a critical factor in obtaining a self-sustaining chain reaction utilizing natural uranium and graphite. The K factor of a mixture of fine uranium particles in graphite, assuming both of them to be theoroetically pure, would only be about .785. Actual K factors as high as 1.07 have been obtained using aggregation of natural uranium in the best known geometry, and with as pure materials as it is presently possible to obtain.

Assuming theoretically pure carbon and theoretically pure natural uranium metal, both of the highest obtainable densities, the maximum possible K factor theoretically obtainable is about 1.1 when the uranium is aggregated with optimum geometry. Still higher K factors can be obtained by the use of aggregation in the case of uranium having more than the naturally occurring content of fissionable elements. Adding such fissionable material is termed enrichment of the uranium.

It is thus clearly apparent that the aggregation of the uranium into masses separated in the slowing material is one of the most important, if not the most important factor entering into the successful construction of a self-sustaining chain reacting system utilizing relatively pure natural uranium in a slowing material such as graphite in the best geometry at present known, and is also important in obtaining high K factors when enrichment of the uranium is used.

Somewhat higher K factors are obtainable where moderators such as deuterium oxide or beryllium are used. Thus with beryllium it is possible to secure a K factor as high as 1.10 with optimum geometry and absolute purity. Moreover with deuterium oxide K factors of about 1.27 may be obtained. When such moderators are used the problem of aggregation may be somewhat less important although it is an essential factor if maximum K factors and minimum size reactors are to be obtained.

The thermal neutrons are also subject to capture by the slowing material. While carbon and beryllium have very small capture cross sections for thermal neutrons, and deuterium still smaller, an appreciable fraction of thermal neutrons (about 10 percent of the neutrons present in the system under best conditions with graphite) is lost by capture in the slowing material during diffusion therethrough. It is therefore desirable to have the neutrons reaching thermal energy promptly enter uranium.

In addition to the above-mentioned losses, which are inherently a part of the nuclear chain reaction process, impurities present in both the slowing material and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capturing neutrons to the detriment of the chain reaction from both the slowing material and the uranium. If these impurities, solid, liquid, or gaseous, and in elemental or combined form, are present in too great quantity, in the uranium bodies or the slowing material or in, or by absorption from, the free spaces of the system, the self-sustaining chain reaction cannot be attained. The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, it has fortunately been found that, in general, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to affect the operation to widely different extents; for example, relatively considerable quantities of elements such as hydrogen may be present, and, as previously suggested, the uranium may be in the form of oxide, such as $UO_2$ or $U_3O_8$, or carbide, although the metal is preferred. Nitrogen may be present to some extent, and its effect on the chain reaction is such that the neutron reproduction ratio of the system may be changed by changes in atmospheric pressure. This effect may be eliminated by enclosing or evacuating the system if desired, or may be utilized by determining changes in a particular system in the reproduction ratio as changes occur in the atmospheric pressure. A sensitive barometer is thus obtained. In general, the inclusion of combined nitrogen is to be avoided.

The effect of impurities on the optimum reproduction factor K may be conveniently evaluated to a good approximation, simply by means of certain constants known as "danger coefficients" which are assigned to the various elements. These danger coefficients for the impurities are each multiplied by the percent by weight of the corresponding impurity, and the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross section for absorption of thermal neutrons of the various elements. These values may be obtained from physics textbooks on the subject and the danger coefficient computed by the formula $$\frac{\sigma_i}{\sigma_\mu} \cdot \frac{A_\mu}{A_i}$$

wherein $\sigma_i$ represents the cross section impurity and $\sigma_\mu$ the cross section for the uranium, $A_i$ the atomic weight of the impurity and $A_u$ the atomic weight for uranium. If the impurities are in the carbon, they are computed as their percent of the weight of the uranium of the system.

Presently known values for danger coefficients for some elements are given in the following table, wherein the elements are assumed to have their natural isotopic constitution unless otherwise indicated, and are conveniently listed according to their chemical symbols:

| Element | Danger Coefficient | Element | Danger Coefficient |
|---|---|---|---|
| He | 0 | Cu | 1.8 |
| Li | 310 | Zn | 0.61 |
| B | 2,150 | Ca | 1 |
| N | 4.0 | As | 2 |
| F | 0.02 | Se | 6.3 |
| Na | 0.65 | Br | 2.5 |
| Mg | 0.48 | Rh | 50 |
| Al | 0.30 | Ag | 18 |
| Si | 0.26 | Cd | 870 |
| P | 0.3 | In | 54.2 |
| S | 0.46 | Sn | 0.18 |
| Cl | 31 | Sb | 1.6 |
| K | 2.1 | I | 1.6 |
| Ca | 0.37 | Ba | 0.30 |
| Ti | 3.8 | Sm | 1,430 |
| V | 4 | Eu | 435 |
| Cr | 2 | Gd | 6,320 |
| Mn | 7.5 | Pb | 0.03 |
| Fe | 1.5 | Bi | 0.0025 |
| Co | 17 | Th | 1.1 |
| Ni | 3 | | |

Where an element is necessarily used in an active part of a system, it is still to be considered as an impurity; for example, in a structure where the uranium bodies consist of uranium oxide, the actual factor K would ordinarily be computed by taking that fact into account using as a base K a value computed for theoretically pure uranium.

As a specific example, if the materials of the system under consideration have .0001 part by weight of Co and Ag, the total danger sum in K units for such an analysis would be:

$$.0001 \times 17 + .0001 \times 18 = .0035 \text{ K units}$$

This would be a rather unimportant reduction in the reproduction factor K unless the reproduction factor for a given system, without considering any impurities, is very nearly unity. If, on the other hand, the impurities in the uranium in the previous example had been Li, Co, and Rh, the total danger sum would be:

$$.0310 + .0017 + .0050 = .0377 \text{ K units}$$

This latter reduction in the reproduction factor for a given system would be serious and might well reduce the reproduction factor below unity for certain geometries and certain moderators so as to make it impossible to effect a self-sustaining chain reaction with natural uranium and graphite, but might still be permissible when using enriched uranium in a system having a high K factor.

This strong absorbing action of some elements renders a self-sustaining chain reacting system capable of control. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction. Consequently, it is another object of our invention to provide a means and method of controlling the chain reaction in a self-sustaining system.

When the uranium and the slowing material are of such purity and the uranium is so aggregated that fewer neutrons are parasitically absorbed than are gained by fission, the uranium will support a chain reaction producing an exponential rise in neutron density of the overall size of the system is sufficiently large to overcome the loss of neutrons escaping from the system. Thus the overall size is important.

The size of the system will vary, depending upon the K factor of the system, and upon other things. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector the following formula gives the critical overall radius (R) in feet:

$$K - 1 = \frac{C}{R^2}$$

where C is a constant that varies slightly with geometry of the lattice and for normal graphite lattices may have a value close to 7.2.

For a rectangular parallelepiped structure rather than spherical, the critical size can be computed from the formula $$K - 1 = C\left(\frac{1}{a^2} + \frac{1}{b^2} + \frac{1}{c^2}\right)$$

where $a$, $b$, and $c$ are the lengths of the sides in feet. The critical size for a cylindrical structure is given by the formula, irrespective of the shape of the uranium bodies Cylinder height $h$ ft.
Radius $R$ ft.

$$K - 1 = C\left(\frac{1}{h^2} + \frac{.59}{R_2}\right)$$

However, when critical size is attained, by definition no rise in neutron density can be expected. It is therefore necessary to increase the size of the structure beyond the critical size but not to the extent that the period for doubling of the neutron density is too short, as will be explained later. Reactors having a reproduction ratio ($r$) for an operating structure with all control absorbers removed and at the temperature of operation up to about 1.005 are very easy to control. Reproduction ratio should not be permitted to rise above about 1.01 since the reaction will become difficult to control. The size at which this reproduction ratio can be obtained may be computed from modifications of the above formulae for critical size. For example, for spherical active structures the formula $$K - r = \frac{C}{R^2}$$

may be used to find R when K is known and $r$ is somewhat over unity. The same formula will, of course, give $r$ for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by almost 2 feet, resulting in a considerable saving of uranium or uranium compound.

The rate of production of element $94^{239}$ will depend on the rate of neutron absorption by $U^{238}$ and is also proportional to the rate at which fissions occur in $U^{235}$. This in turn is controlled by the thermal neutron density existing in the reactor while operating. Thus for maximum production of element $94^{239}$, it is essential that the thermal neutron density be at a maximum value commensurate with thermal equilibrium.

Considerable heat is generated during a neutronic reaction primarily as the result of the fission process. Following are tables showing more specifically the type of heat generated in the reactor.

*Summary by type*

|  | M. e. v./fission | Percent |
|---|---|---|
| Gamma radiation | 18 | 9 |
| Beta radiation | 16 | 8 |
| Kinetic energy of fission fragments | 160 | 80 |
| Kinetic energy of neutrons | 6 | 3 |
|  | 200 | 100 |

*Summary by locale where heat is generated*

|  | M. e. v./fission | Percent |
|---|---|---|
| In uranium | 174 | 87 |
| In moderator | 16 | 8 |
| Outside pile | 10 | 5 |
|  | 200 | 100 |

*Summary by type and locale*

|  | M. e. v. per fission | Percent in U | Percent in C | Percent Outside |
|---|---|---|---|---|
| Kinetic energy of fission fragments | 160 | 100 |  |  |
| Kinetic energy of neutrons | 6 |  | 99 | 1 |
| Gamma radiation from fission products | 6 | 50 | 45 | 5 |
| Beta radiation from fission products | 16 | 100 |  |  |
| Nuclear affinity of neutrons (gamma radiation) | 12 | 70 | 25 | 5 |

When the system is operated for an extended period of time at a high production output of element $94^{239}$, the large amount of heat thus generated must be removed in order to stabilize the chain reaction. Most of the heat in an operating device is generated as the result of the nuclear fissions taking place in the $U^{235}$ isotope. Thus, the rate of heat generation is largely proportional to the rate at which the fissions take place. In other words, if the rate of generation of neutrons is increased, a greater amount of coolant must be passed through the reactor in order to remove the heat thus generated to avoid damage, particularly at the central portion of the pile, by excessive heat. Thus, the highest obtainable neutron density at which a system can be operated for an extended period of time is limited by the rate at which the generated heat can be removed. That is to say, the maximum power output of a system is limited by the capacity of the cooling system. An effective cooling system is therefore a primary requirement for high power operation of a neutronic reactor and it has been found that this cooling may be accomplished most effectively by passage of the coolant in contact with or in close proximity to the uranium.

After the neutronic system has operated for a period of time sufficient to cause a quantity of element $94^{239}$ to be produced, it may be desirable to remove at least some of the uranium rods from the reactor in order to extract element $94^{239}$ and the radioactive fission products, both being formed in the uranium rods or for other purposes.

In many neutronic reactors, a neutron density variation occurs across the reactor; that is, the neutron concentration at the periphery is relatively small and increases to a maximum value at the center. Actually, therefore, since the rate of production of element $94^{239}$ is dependent upon the neutron density, the reactor will have zones which may be likened to three dimensional shells, the average concentration of element $94^{239}$ being uniform throughout any given zone. In a reactor built in the form of a sphere these would, of course, be in the shape of concentric spheres of different diameters, while one built in the shape of a cylinder would have similar zones but of different shapes.

Where this variation in concentration exists in a reactor it is often desirable to resort to a systematic schedule of removal depending upon the time of operation and the location of the uranium for removing and discharging uranium metal that has been subjected to neutron bombardment. In the case of a new system of this character the operation would normally continue until the metal in the center portion of the reactor reaches a desired content of element $94^{239}$, at which time this metal would be removed and replaced with fresh metal. The next removal then would be from the section next adjacent to the center section of the reactor where the desired content of element $94^{239}$ is reached after further operation. The process would then proceed with the removal of the metal at various times until the metal recharged at the center of the reactor has reached the desired content of element $94^{239}$. This would then be replaced and the process of progressing towards the periphery continued with periodic return to more central areas. Since the neutron density in the central areas of such a reactor would, ordinarily, greatly exceed the neutron density near the periphery, the metal in the central areas may be replaced several times for each replacement of the metal near the periphery. A removal schedule can be developed by calculation and checked by actual experience after the system has been placed in operation.

Different schedules may be developed with other reactors having different reactivity curves. For example, certain reactors are constructed in a manner such that the neutron concentration is substantially uniform throughout a large volume of the reactor. In such a case the schedule for removal of uranium bodies may be modified accordingly.

Since the heat generated in the reactor results from fissions in the uranium, it is evident that this heat is not formed uniformly throughout the reactor but that it must vary across the reactor with the local rate at which fissions occur and element $94^{239}$ formed. Consequently, the relative values for the production of element $94^{239}$ apply also to heat distribution; that is, the heat generated may increase from a minimum at the outer surface of the reactor to a maximum at the center in certain reactors.

As the total weight of the radioactive fission elements is proportional to that of the $94^{239}$ at the time of fissions it might be assumed that the amounts of these radioactive fission elements and of $94^{239}$ present in metal removed from the reactor are also of the same proportion. This is not true, however, as the fission elements when produced are highly radioactive and immediately start to decay, some with short half-lives and others with longer half lives until, through loss of energy, these unstable fission elements arrive at a stable non-radioactive element or isotope and no longer change. The $94^{239}$ on the other hand is a relatively stable element when formed, having a radioactive half-life of about $2 \times 10^4$ years.

At the start of the reaction in new metal the radioactive fission elements and the $94^{239}$ both increase in amounts. After a certain period of operation during which time the metal is subjected to intense neutron bombardment the radioactive fission elements will reach a state of equilibrium and from that time on the amounts of these radioactive elements remain constant, as the fission elements with shorter half lives are reaching a stable condition at the same time new ones are being produced. The amount of the stable end products of fission, however, continues to increase with the increase in element $94^{239}$. Consequently, the rate of formation of the fission end products is dependent upon the location of any particular metal in the reactor, and the power at which the system operates controls the maximum radioactive fission element content regardless of the length of time the system operates after equilibrium occurs. The quantity of element $94^{239}$ on the other hand, and of the final and stable end products of fission continue to increase as the operation of the system continues. The amounts of both $94^{239}$ and fission end products present are controlled only by the location of the metal in the reactor and the time and power of operation. The highly radioactive fission elements may, therefore, vary from a substantial percentage of the weight of element $94^{239}$ present in the metal at the center of the reactor after a short period of operation, to a very small percentage in metal from a position near the periphery of the reactor after an extended operating period at a given power.

It is not to be assumed, however, that the fact that equilibrium can be obtained between the original highly radioactive fission elements and the stable fission end products that all radioactivity will cease when the original fission elements have been permitted to decay for a time equal to the equilibrium period, for example. Many of the original fission elements have long half lives that, taken together with their successive radioactive disintegration products existing long after the fission elements having a shorter half life have decayed, renders the uranium still radioactive especially after prolonged bombardment at high neutron densities. In addition, the successive radioactive disintegration products of the original shorter lived fission elements may still be present.

The equilibrium radioactivity is so intense that metal taken from the reactor for the recovery of element $94^{239}$ and fission products immediately after bombardment at high neutron densities will heat spontaneously due to self absorption of the intense radioactivity of the remaining radioactive fission products. The amount of heat generated as the result of the spontaneous heating will depend particularly on three factors: (1) the concentration of element $94^{239}$ and fission products in the metal; (2) the period of time for continuous operation required to reach this concentration; and (3) the elapsed time since the reactor was shut down and the metal was removed.

The metal from the center of the reactor in a system operating at a high power output, for example, at a $94^{239}$ concentration of 1 to 2,000, if not cooled, can increase in temperature at the rate of about 2000° C. per hour one day after the neutron activity of the system has been shut down. After 30 days shut down following an operation of 100 days at an output of 500,000 kilowatts, the average temperature rise can be approximately 572° C. per hour. The uranium metal of the type used in the chain reacting systems herein under consideration melts at about 1100° C.

Under these conditions uranium bombarded with neutrons for an extended period of time at high rates of power output can be safely removed from the reactor under one of the following methods:

(1) The neutron activity of the system is shut down and the uranium is kept in the reactor and continuously cooled until the radioactivity decays to a point where the metal can be removed without melting in ambient air. This procedure may require that the metal remain in the reactor for a period of from 30 to 50 days after the neutron bombardment has ceased.

(2) The neutron activity of the system is shut down and the uranium is kept in the reactor with the cooling system in operation for only a few days to permit the most violent radioactivity to subside and then the metal is removed from the reactor with the cooling discontinued during the removal except for cooling by the atmosphere or by water spray. The metal is then promptly placed under more efficient cooling conditions before the temperature of the uranium has become excessive.

(3) The neutron activity of the system is shut down and the uranium bodies from one passage are removed while cooling of the remaining uranium bodies in the reactor is continued at least to an extent sufficient to prevent the temperature from becoming excessive.

It is also important, of course, from the point of view of biological safety of operating personnel that adequate shielding be provided to absorb the strong gamma radiations from the fission products present in the active uranium while being removed from the reactor. The neutron activity in the reactor completely ceases within 30 minutes after shut down of the neutronic reaction during which period delayed neutrons are being emitted. In no case then should the uranium be removed from the reactor immediately following shut down of the neutronic reaction, but sufficient time should be given to permit all delayed neutrons to be emitted. Thus, the shielding required during the removal of the uranium rods from the system is primarily intended to protect personnel from gamma radiations. As stated above, immediately following shut down of the neutronic reaction, there are many short lived radioactive fission elements in the uranium causing the gamma radiation to be very intense. Many of these elements decay into more stable products within the first thirty minutes following shut down of the reaction. Thus, the fission products lose a large amount of their radioactivity during this period.

While the method of extracting the fission products and element $94^{239}$ from the bombarded uranium taken from the reactor forms no part of the present invention, the fission products and element $94^{239}$ are removable and when removed are extremely useful. The radioactive fission products are valuable for use as radiation sources, many having long half lives with high energy gamma radiation sufficient for radiography of even heavy metal castings. In addition, some of the fission products are useful as radioactive tracers in biological and physiological research.

Element $94^{239}$ is exceptionally useful because it is fissionable by slow neutrons in the same manner as the uranium isotope $92^{235}$ contained in natural uranium. The separation of $92^{235}$ from $92^{238}$ in natural uranium is extremely difficult since both are isotopes of the same element and these isotopes vary only a small percentage in comparative weight. Element $94^{239}$ on the other hand, is a different element from uranium, having different chemical properties than uranium, and therefore can be chemically separated from uranium. After separation, for example, element $94^{239}$ can be added to natural uranium to supplement the $92^{235}$ content, thus increasing the amount of fissionable material in the uranium. This enriched uranium can then be used in neutronic systems making it possible to provide more cooling facilities, for example, than can be used in a system of the same geometry employing only natural uranium. Thus, an enriched neutronic system may provide a greater power output than would be possible in a natural uranium system having the same geometry.

A more complete description of the design construction and operation of neutronic reactors will be found in Fermi et al. Patent 2,708,656, dated May 17, 1955.

Among the objects of the present invention are the following:

To provide a liquid-cooled neutronic reactor arrangement operating by virtue of nuclear fission of fissionable material in the form of bodies over which the liquid coolant passes and in which the bodies may be readily removed from the reactor and replaced;

To provide a neutronic reactor arrangement wherein the liquid coolant is passed between the moderator and the bodies containing fissionable material wherein the bodies are readily removed from the reactor and replaced;

To provide a neutronic system employing a reactor at least partially covered with water wherein the bodies of fissionable material are readily removed from the reactor through the water; and To provide a neutronic system wherein the bodies of fissionable material are made available for removal from the system, requiring only a limited period following cessation of the neutronic reaction for the decay of short-life radioactivity of certain fission products to take place before the removal operation is commenced.

The foregoing constitute some of the principal objects and advantages of the present invention, others of which will become apparent from the following description and the drawings, in which:

Fig. 3 is an enlarged vertical sectional view taken through the reactor shown in Fig. 2 and illustrating the arrangement of the uranium and graphite and the disposition of the water and tubes forming the cooling system, a portion of the reactor being shown in elevation, at least portions of said drawing not being drawn to scale;

Fig. 4 is a horizontal sectional view not to scale taken through the water tank at the top of the reactor showing the arrangement of the tubes extending downwardly from the tank;

Fig. 7 is an enlarged fragmentary sectional view taken horizontally through the reactor showing the arrangement of the uranium rods in the graphite moderator;

Fig. 10 is a diagrammatic view showing the control system for the reactor electrical circuit being reduced to the lowest terms.

In the reactor forming the subject matter of the present invention, the coolant is passed over the exterior surfaces of the uranium. For purposes of convenience, such an arrangement will be identified as an externally cooled structure. This will serve to distinguish from the internally cooled arrangement where the coolant passes through a central longitudinal passage in the uranium bodies.

As shown, the uranium rods are disposed in tubes or liners disposed in the graphite moderator. The diameter of each rod is less than the inside diameter of its corresponding tube so that there is provided a passage between the rod and the tube walls through which the coolant may pass. Heat generated in the rods as the result of the neutronic reaction, or due to the intense radioactivity of the short-lived fission elements in the rods resulting from the neutronic reaction, passes to the outer surfaces of the rods and is carried away by the stream of coolant. Likewise, heat originating in the graphite is conducted through the graphite mass to the cooling passages where it is picked up by the coolant and carried away.

Since the coolant used has a high neutron capture cross section, the film of coolant between the graphite moderator and the uranium rods absorbs some of the thermal neutrons that would otherwise pass from the graphite into the rods and produce fissions. Other thermal neutrons passing from the graphite toward the rods are reflected back into the graphite by the film of coolant. Thus there is a greater opportunity for thermal neutrons to be absorbed parasitically in the graphite and the coolant than would be the case if the coolant were not interposed between the rods and the graphite. This is known as the blocking effect of the coolant and because of this effect, the reproduction factor for a given geometry, volume ratio and purity may be less for externally cooled systems than for internally cooled systems. Thus the thickness of the water layer surrounding the uranium rods must be so proportioned that the reproduction factor for the neturonic reactor is above unity, for otherwise the chain reaction would not be self-sustaining.

The system disclosed herein includes generally a power unit, herein referred to as the neutronic reactor, a complete heat extracting or cooling circuit adapted to remove from the reactor heat generated as a result of the neutronic reaction, and an effective control system regulating the operation of the neutronic reaction to conform to selected conditions of operation.

The reactor can be one of a variety of types and for purposes of illustration, two embodiments have been selected wherein uranium rods are disposed in graphite.

Figure 1:
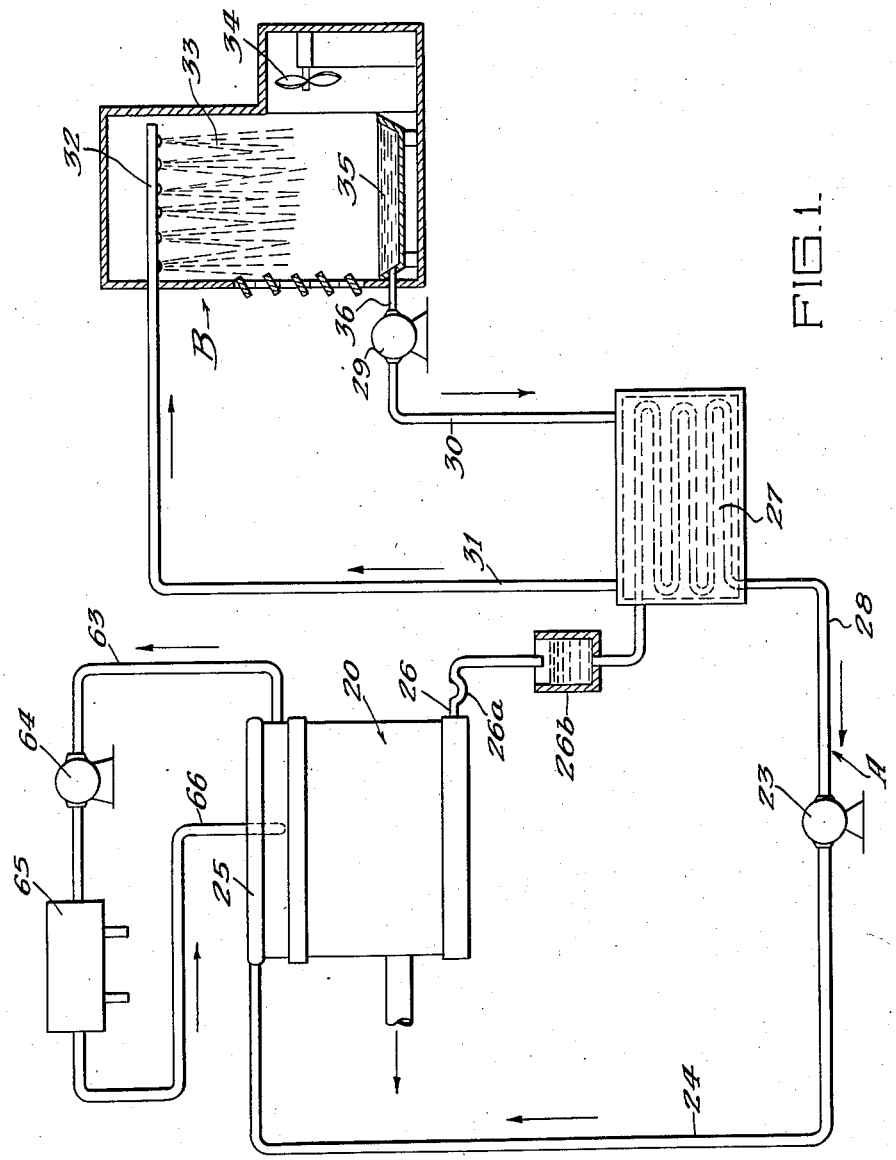
Fig. 1 is a schematic drawing of one embodiment of the complete system.

Referring to Fig. 1 one embodiment of the invention is shown. The neutronic reactor is generally indicated at 20 and includes bodies containing uranium geometrically spaced in graphite blocks piled to form the reactor. The specific details of the reactor will be explained presently. The heat generated in the reactor as the result of the chain reaction is removed from the reactor by means of water in a cooling system which may be divided into two circuits; viz. a primary cooling circuit indicated at A and a secondary cooling circuit indicated at B in heat exchange relationship with the primary circuit.

The primary cooling circuit A comprises a pump 23 circulating water through an inlet pipe 24 into the reactor 20 through a ring header 25 at the top of the reactor 20. The coolant enters the reactor 20 and passes vertically down through the reactor, as shown in Figs. 1 and 3 and as will be explained later, and leaves the reactor through outlet pipe 26, passing through a water trap 26a to prevent gas escape from the outlet water tank, an outlet sump 26b, through a heat exchanger 27, and finally through a pipe 28 to the pump 23 for recirculation. Thus the outlet water of the reactor is controlled by gravity alone.

The secondary cooling circuit B serves to cool the water in the primary circuit and includes a pump 29 discharging into a pipe 30, which empties into the heat exchanger 27. The cooling medium leaves the heat exchanger 27 through a pipe 31 and passes to a spray head 32 in a cooling tower 33 wherein the water spray is subjected to currents of air produced by a suitable blower fan 34. By means of evaporation of a certain percentage of the water in the cooling tower 33, the remaining water is cooled and collects in a suitable pan or sump 35 at the bottom of the cooling tower, from which the pump 29 draws the coolant through a pipe 36.

For purposes of illustration, water leaving the reactor 20, may be at a temperature of approximately 200 degrees Fahrenheit, and is cooled in the heat exchanger 27 to a temperature of about 85 degrees Fahrenheit. These conditions illustrate a suitable temperature differential between the cooling water entering and leaving the reactor 20. In the secondary cooling circuit B, the water leaving the heat exchanger 27 through a pipe 31 is at a temperature of approximately 130 degrees Fahrenheit, and this liquid is cooled by a process of evaporation in the cooling tower 33 to a temperature of about 75 degrees Fahrenheit. Thus, the temperature differential between the water entering and leaving the heat exchanger 27 is about 55 degrees.

Figure 2:
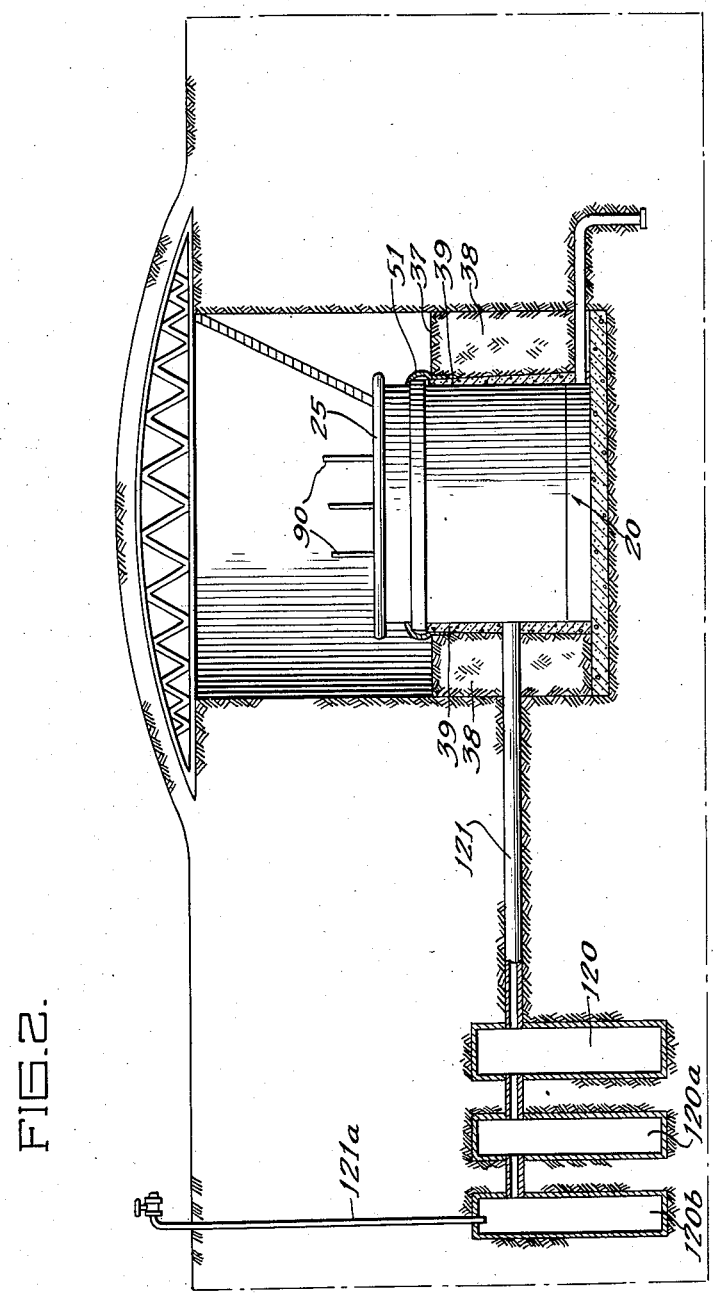
Fig. 2 is a schematic drawing of the reactor shown disposed below the level of the ground.

Because intense gamma radiation and both fast and slow neutrons escape from the pile, it is essential to surround the reactor with some suitable protective shielding. As shown in Fig. 2 the reactor 20 may be disposed below the level of the ground indicated at 37. The bottom and sides of the reactor are surrounded by earth 38 so that escaping neutrons and harmful gamma rays are absorbed in the earth, and by this means protection is provided to individuals working about the reactor. Further shielding is required across the top of the chain reacting unit, details of which will be described presently.

The reactor itself may take a variety of shapes and arrangements. Uranium metal is preferred to furnish the neutrons for the chain reaction, though uranium compounds may be used, as, for example, uranium oxide or uranium carbide. Also, combinations of these forms may be employed.

Referring to Fig. 3, a specific form of the invention is illustrated, wherein the active portion of the reactor takes the form of a cylinder about 5½ meters high and 7.6 meters in diameter. Uranium metal is used in the form of rods each having a diameter of about 3.22 centimeters and a height of about 5½ meters. These rods are arranged approximately 25 centimeters apart, and in all there are about 850 rods. This is for a system employing about 68 tons of uranium metal rods of high purity, said rods being geometrically arranged in approximately 450 tons of high quality graphite in the form of rectangular blocks. If a carbon reflector of sufficient thickness is placed around the outside of the active portion, the uranium could be reduced to 50 tons.

The reactor rests on a concrete floor and is surrounded by a concrete wall 39, which completely surrounds the reactor unit on its sides as shown in Fig. 3. The active portion of the reactor 20 consists of the vertically disposed uranium rods 40 surrounded by the moderator, such, for example, as graphite 41.

Referring to Fig. 4, the uranium rods 40 are shown spaced in a triangular arrangement in the graphite 41. It is recognized that other spacing arrangements are equally suitable—such, for example, as a square disposition of the rods.

Again referring to Fig. 3, the rods 40 are disposed vertically and extend from a position substantially at the top of the concrete wall 39 to a floor 42 spaced above the bottom of the foundation. Between the floor 42 and the bottom of the foundation is a discharge tank or header 43 extending over the entire floor area of the foundation and having a depth of about ½ meter. This tank serves as the outlet or discharge header for the water in the cooling circuit. The floor 42 may be supported in any suitable manner, such, for example, by posts 44 resting on the bottom of the discharge header 43.

Figure 6:
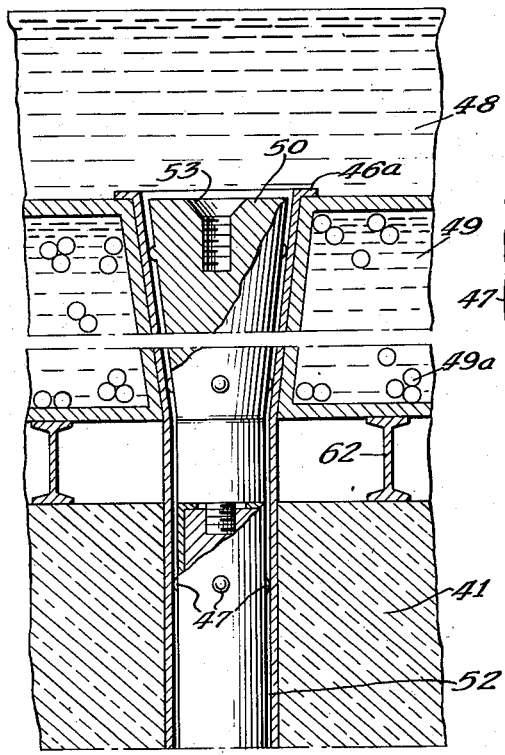
Fig. 6 is an enlarged, fragmentary, detailed sectional view taken vertically through the reactor showing one uranium rod and its relationship to the graphite and other elements making up the reactor.
Figure 5:
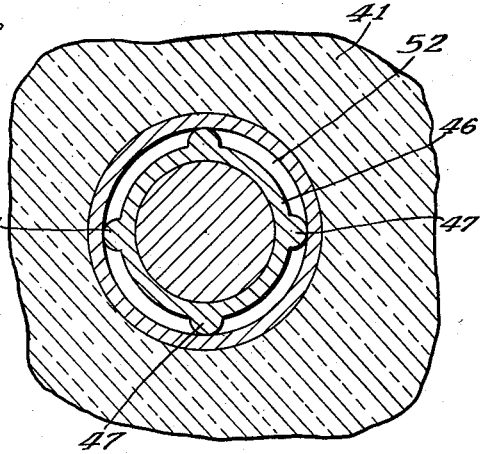
Fig. 5 is an enlarged, fragmentary, sectional view taken on line 5—5 of Fig. 6.

Referring to Figs. 5 and 6, each of the uranium rods 40 is covered with a continuous metallic sheath 45. The purpose of this sheath is to keep the water from directly contacting the uranium and to keep fission products from entering the water or the carbon. The corrosion of the uranium due to water reaction is particularly serious when the water is at a temperature close to the boiling point.

A zinc coating of 5 mils in thickness may be used, but a 1 millimeter covering of aluminum is more resistant to corrosion. However, the 1 mm. aluminum covering reduces the reproduction factor K by approximately .0055 while the 5 mil. coating of zinc reduces it only .004. The sheath should be bonded to the uranium in order to achieve as good heat transfer as is possible. Each sheathed uranium rod 40 is suspended inside of an aluminum tube or liner 46 that extends through a passage in the moderator from the upper water tank 48 through the reactor floor 42 to the lower discharge tank 43. The tubes 46 are in close contact with the graphite 41 to provide a good heat transfer between water and the graphite. The diameter of each tube 46 is reduced on its lower end. By varying the amount of reduction of the tubes 46 the water flow may be adjusted so that more water passes around the hotter uranium rods in the center of the reactor, than around the cooler rods nearer the edge.

The upper end of each tube 46 is funnel-shaped as shown in Fig. 6, with the extreme upper end formed into a flange 46a that is sealed to the enclosed water tank 49.

Each sheathed uranium rod 40 is suspended inside of a tube 46 by means of a steel plug 50 having the same general outline as the funnel shaped portion of tube 46 and being slightly smaller than said tube. Plug 50 is screwed onto the upper end of the rod 40 and extended to the top of the graphite as shown in Fig. 6. A plurality of rounded protuberences or lugs 47 center the rod 40 in tube 46 and space it therefrom, leaving a 1.7 millimeter annular passage 52 surrounding the rod through which water passes from the upper water tank 48 to the discharge tank 43.

Plug 50 being of steel absorbs a portion of the neutrons and gamma rays escaping up tube 46. The water in tank 48 absorbs most of those that pass around plug 50. A threaded socket 53 is provided in the upper end of plug 50 into which a tool may be inserted for removing rod 40 from the reactor. This operation will be further described hereinatfer.

If the reactor is opened to the atmosphere there is considerable neutron absorption by the air. Therefore the reactor is preferably sealed and the air replaced by helium which has a much lower neutron absorption coefficient than oxygen or nitrogen. As illustrated in Fig. 2, gas expansion tank 120, 120a and 120b are connected to the reactor 20 by means of pipe 121. A fill pipe 121a is connected to tank 120b. As the temperature of the reactor rises the helium expands into the gas expansion tanks 120, 120a and 120b.

As shown in Fig. 3, a horizontal combination shield and water tank assembly is generally indicated at 48 and extends entirely over the top of the pile and is supported on the foundation 39. This assembly is made up of a lower enclosed tank 49 disposed horizontally across the top of the pile and serving as a shield, and an upper water inlet tank or header 50 coextensive with the lower tank. A gas seal is effected between the water tank assembly 48 and the wall 39 by means of a sealing member indicated at 51 in Fig. 3. This sealing member 51 is fastened to the assembly 48 and extends downwardly along the outer surface of the foundation 39 to a position below the ground level indicated at 37. By this means the entire reactor is gas sealed to retain all gases inside of said reactor.

The upper tank 150 is fed with water by ring header 25. Tank 150 may be of any desired depth to give the necessary head to achieve the flow desired around the uranium rods 40. Although the tank 150 is shown open on top, it will be understood that if a higher pressure is necessary the top may be closed so that pump 23 may place the water in said tank under any desired pressure. The closed top of the tank is usually divided into segments so that portions of the top may be removed for unloading of uranium.

In the space between the graphite 41 and the shield 49 are suitable beams 62 (Fig. 6) resting on the concrete foundation 39 and supporting the water tank and shield assembly 48.

The shield 49 is filled with iron shot 49a and water 49b, the combination of which provides a satisfactory neutron and gamma ray absorber so as to reduce the escape of these harmful radiations from the reactor to safe biological values for personnel on top of the pile. For a plant having an output of about 100,000 kilowatts, a satisfactory thickness for the shield 49 is 60 centimeters.

The water in the shield 49 must be cooled. For this purpose, a separate cooling system may be employed. Referring to Fig. 1 the water is pumped out of the shield 49 through a pipe 63 by a pump 64, and is passed through a suitable heat exchanger or cooler 65, and then is returned to the shield through a pipe 66. A cooling medium is passed in heat exchange relationship with the water flowing through the cooler 65.

Referring to Figs. 3 and 4, six safety rods 90 are disposed circumferentially about the center of the reactor. A control rod 91 is placed at the center of the reactor. All of these rods extend vertically through and project out the top of the pile as indicated in Fig. 3.

Each safety rod when in its lowered position, shown schematically in Fig. 10 extends from the top of the water tank 150 to a position slightly above the bottom of the graphite 41. The safety rods 90 and control rod 91 operate through stuffing boxes so that they may slide freely without allowing the escape of gas from the reactor.

The safety rods 90 are normally in their extreme upper position and are held there during operation of the pile. Their purpose is to stop the chain reaction in the pile either when the reaction becomes too violent, or under normal conditions when the reaction is to be stopped. They function as an efficient neutron absorber, and when in their lowered positions, they absorb a sufficient number of neutrons so as to lower the reproduction ratio of the pile to a value well below unity.

Iron is a relatively good neutron absorber, and therefore serves as a very satisfactory material for the safety rods. The incorporation of boron in the iron serves to increase the efficiency of the rod as a neutron absorber, and consequently is advantageous in the rod composition. A rack 97 is shown at the top of each safety rod 90, and serves as a convenient member for manipulating the rod.

As shown, the safety rods 90 pass through the iron and water shield 49 so as to break the continuity of the shield across the top of the reactor. Each safety rod, then, serves the additional function of plugging the opening through which it passes, to prevent the escape of neutrons and gamma radiations from the reactor.

The control rod 91 is also shown schematically in Fig. 10. This control rod may take several forms. We prefer to use a sheet of cadmium enclosed in aluminum for strength, because cadmium has a very high neutron absorption coefficient so that a relatively small quantity inserted into reactor will absorb a large quantity of neutrons.

The power plant above described is ideally adapted for automatic control to maintain the neutron density within the reactor substantially constant, and thus give a substantially constant power output. Due to the fact that large masses of materials are utilized in the reacting portion of the structure, there is a temperature lag therein. Consequently, it is convenient to monitor and control the structure by means of ionization chambers, or equivalent devices which will measure the neutron density at the periphery of the lattice portion of the structure. As the rate of neutron diffusion out of a chain reacting system is always proportional to the rate of generation of neutrons within the structure, the ionization chambers can readily be placed at the periphery of the active portion or lattice, and in fact are preferably so positioned in order that they be not subjected to the extremely high neutron densities existing near the center of the reactor.

Before proceeding to a description of one type of control system that may be utilized in controlling the pile described herein, it is desirable to point out the manner in which the control rods operate to regulate the neutron density. In any self-sustaining chain reacting structure adapted to produce power, the attainable neutron multiplication ratio of the system must be greater than unity. For any value over unity, the chain reaction becomes self-sustaining and the neutron density, without control, would increase exponentially in point of time, until the device is destroyed. For proper control, the system must be held in balance by maintaining the chain reaction at some point where the production of new neutrons is balanced with the neutrons initiating the chain. Under these conditions, the reacting portion of the structure will continue to maintain the neutron density therein which obtained when the system was balanced.

However, in order to enable the reactor to reach a desired neutron density, the system must be permitted, for a period of time, to rise in neutron density until the desired density is reached. After that it is only necessary to hold the system in balance.

Inasmuch as the reproduction ratio of any pile is reduced by the presence of impurities which absorb neutrons, such impurities can be introduced in the pile in the form of the control rod which can be of a material such as cadmium or boron which will absorb large amounts of neutrons. The depth to which this control rod penetrates into the pile will determine the amount of neutron absorption and therefore the reproduction ratio of the pile. A range can be obtained between a condition providing a neutron reproduction ratio which is greater than unity and a condition at which no chain reaction can be maintained. The exponential rise of neutron density can be made relatively fast or relatively slow, in accordance with whether the multiplication ratio is permitted to be much greater than unity, or only slightly greater than unity. Between 0.05 percent and one percent of the neutrons emitted in the fission process are delayed neutrons. These delayed neutrons cause the neutron density to rise in a finite time rather than instantaneously. The time required for doubling the neutron density increases as the multiplication ratio approaches unity, and any desired rate of rise can be obtained.

The broad method of control preferred is to withdraw all safety rods from the pile and then withdraw the control rod from the structure to a point where there is an exponential, and preferably slow rise in neutron density within the structure. When a desired neutron density has been reached, the control rod is then returned into the pile to a point where the reaction is balanced. This balance is then maintained to maintain a constant power output in the reactor. The maintenance of the balance point with the control rod would be relatively simple were it not for the fact that changes in temperature in the pile change the reproduction ratio of the structure slightly. It is desirable, therefore, that the control rod be so manipulated that a substantially constant neutron density within the system is maintained. Such a method of control may be accomplished by automatic connection of the control rods with an ionization chamber or similar device measuring neutron density, positioned within the reactor close to the active portion of the pile.

Furthermore, due to the exponential rise of neutron density, within the reacting structure when the multiplication ratio is greater than unity, all possible precautions must be taken to prevent a continued exponential rise in neutron density, in case of failure of the control rod to return to the balance position.

While there are many means by which the control rod and the safety rods can be operated, it is believed that by the illustration and description of one simplified circuit, other and fully equivalent circuits will be made apparent to those skilled in the art.

Referring, therefore to Fig. 10, which shows diagrammatically and reduced to lowest terms one form of control circuit that might be used for regulating the output of the power plant hereinbefore described, and referring first to control circuit A, a control ionization chamber 200 is placed within the reacting structure adjacent to the periphery of the pile, and filled with barium fluoride. A central electrode 201 is provided within the chamber 200 and connected to wire 202 leading outside of the reactor to a movable contact 203 on a resistor 205. Resistor 205 is connected across a relay coil 206. One side of relay coil 206 is connected to battery 207, the other end of which is connected to shield 209 around wire 202. Shield 209 is grounded, as is chamber 200. Alpha ray ionization due to neutron reaction with the barium within chamber 200 is proportional to the neutron density. Thus the current in resistor 205 is varied in accordance with neutron density reaching the ionization chamber. Relay coil 206 operates a relay armature 210 which is spring biased by spring 211 to contact one motor contact 213, and is urged by current in coil 206 to contact a second motor contact 215. Contacts 213 and 215 connect to the outside of split winding 220 of motor 221, the center connection 222 of which is connected through power mains 225 to armature 210. Motor 221 operates shaft 230 having secured thereon a pulley 231, one end of said shaft being connected through a magnetic clutch 232 to a control rod gear 234. Control rod gear 234 meshes with the rack 97 on the control rod 91. Pulley 231 has a cable 240 wound thereon connected to a counter weight 241 so that the weight of the control rod is substantially balanced by counter weight 241 thus permitting motor 221 to run easily in either direction.

Having described a circuit for controlling the position of a control rod, I will now describe its operation, considering the safety rods withdrawn. Slider 203 on resistor 205, having previously been calibrated in terms of neutron density, is moved to the density position at which it is desired the reactor to operate, taking into account the difference in neutron density at the center of the lattice and at the periphery thereof during operation. This difference is a constant ratio at various operative densities. The reactor, having at best a neutron density much lower than the desired density at which relay coil 206 will receive enough current to operate armature 210, very little ionization takes place in ionization chamber 200 thus causing armature 210 to rest against contact 213. Motor 221 is thus energized to withdraw the control rod 98 from the reactor to a point as determined by a limit stop 242 where the multiplication ratio of the reactor is just sufficiently greater than unity to permit an exponential rise in neutron density within the reactor. The motor 221 will stall when the rod is at stop 242 and should be of a type permitting stalling for the required time. The reaction at this position of the control rod becomes self-sustaining and the neutron density rises. In consequence the ionization within chamber 200 rises. As the ionization in chamber 200 increases, more and more current passes through relay coil 206 until the desired value has been reached. Relay coil 206 then operates to cause armature 210 to connect with contact 215, thus reversing the motor 221 to drive the control rod into the reactor to a point where the neutron density starts to decay. The control rod 90, will thereafter hunt between a point above the balance position where the neutron density rises, and a point below the balance position where the neutron density decays, thus providing an average neutron density within the reactor as determined by the setting of slider 203 on resistor 205. As the mass of the reactor causes any temperature change to lag behind any neutron density change, the temperature of the reactor is maintained substantially constant. If desired, any of the well-known anti-hunting circuits may be utilized, as will be apparent to those skilled in the art.

The main purpose of the control circuit A is to regulate the control rod to substantially balance the neutron density to maintain any desired average temperature within the reactor.

Due to the fact that it might be possible for the control system as described to fail, and thereby leave the control rod in a position where the neutron density would continue to rise indefinitely, both the safety rods 90 and the control rod 98 are preferably to be operated so as to enter the pile immediately upon any failure of the control rod system. One such emergency circuit that illustrates the operation of the safety rods is illustrated in circuit B. The circuit for each of the safety rods is the same.

Circuit B comprises a connection to the power mains 225. One side of the mains passes through a plurality of hand operated emergency switches 250, a flow switch 251 in water outlet pipe 26, a thermostat 252 in the same pipe, and a contact 254 held in connection with a relay armature 255 by a spring 256, all switch connections being normally closed. Both legs of mains 225 then are connected to energize magnetic clutch 232 on the control rod shaft 230 and also a similar magnetic clutch 260 on a safety rod shaft 261.

Safety rod shaft 261, on one side of magnetic clutch 260 ends in a safety rod gear 262 meshing with safety rod rack 97. On the other side of clutch 260 a safety rod pulley 264 has a cable 265 wound thereon connecting with a safety rod counter weight 266. Thus the safety rod, with clutch 260 energized, will stay in any position it is placed.

Safety rod 90 is normally moved in and out of the pile by safety rod motor 270 by connection to mains 255 through hand switch 271.

Relay armature 255 is controlled by an ionization chamber circuit identical in all respects with the circuit previously described for operating the control rod, this safety circuit being given the same numbers plus 100. The circuit may be adjusted, for example, to attract relay armature 255 and open the circuit when the neutron density reaches 5% over the normal operating density. In addition, flow switch 251 opens the circuit when output water flow falls below a safe level. When output water temperature reaches 210° F., for example, thermostat 252 will open the circuit. Hand-switches 250 located in convenient spots can be used for the same purpose by the operating personnel.

Safety rod magnetic clutch 260 is connected in parallel with control rod magnetic clutch 232. Thus, upon any failure of power in the mains or the opening of any of the switches 251, 252, or 250, all of the rods will be relieved of their counter weights and will fall into the pile by gravity. Stops may be provided on the rods, and any suitable braking action used to reduce the impact shock on the reactor.

Irrespective of how the circuit is opened, magnetic clutches 232 and 260 disengage, and remove the influence of the counter weights from the rods. The rods then drop into the system by gravity, stopping the reaction.

To construct the system, a hole is first dug in the earth 15 meters deep and 15 meters in diameter, within a suitable earth retaining wall, if such is needed. A concrete floor of suitable thickness to cover the bottom of the hole is then poured. Concentric within the hole is erected a concrete or reinforced concrete wall of 9 meters inside diameter and 6 meters in height, of suitable thickness and taper, and with proper footings and stiffening columns. Through the wall near the floor pass the pipes for the water system and the gas expansion chambers.

The bottom water tank is then installed. A hole in one side of the tank joins to the water outlet pipe. The water in this tank is not under pressure, and it drains by gravity into sump 26b.

Supports are positioned to rest on the tank bottom and extend to the height of the tank sides. On these supports the floor for the pile is laid, which is also the lid of the outlet water tank. This floor is pierced with openings through which the ends of the cooling tubes will later descend. The reactor shell is then built.

The graphite, preferably in the form of blocks, is then stacked in the space above the floor up to the height of, and out to, the surrounding concrete wall. Between the blocks sufficient clearances are left to allow for graphite expansion when the pile is operating, and for helium diffusion through the pile. Some 850 holes run vertically through the graphite blocks and are kept in vertical alignment with the holes in the floor. Seven vertical holes of about 12 cm. in diameter are provided in the graphite for the control and safety rods, one in the center for the control rod and six on a circle about the center of some four meters diameter. The pipe leading to the gas expansion chamber is just above floor level, and enough space should be left between the graphite blocks for passage of the helium and for graphite blocks expansion.

The vertical holes must be aligned with some care so that the tubes 46 may be inserted and the uranium and control rods will be able to slide freely up and down. These are checked with dummy rods hung from an overhead frame as the stacking of the graphite progresses. The expansion clearances are differentially patterned about the center in accordance with the expected distribution of temperature in the operating plant.

As the graphite stacking progresses, earth is filled in outside the concrete wall to the sides thereof, and up to a little below the top of the wall. The time at which this is done is immaterial. At that time the helium expansion tanks are installed.

The beams over the pile which rest on the walls and are to support the shield and upper water tank are put in place. The shield sections come next, being careful to align the holes therein with those in the graphite.

The tubes or liners 46 are set in place and the shield sections are sealed together so that they represent a continuous gas tight disc except for the safety, control, and uranium rod openings. Sealed to the shield, and extending outwardly and downwardly from it, there is placed the thin metal gas cover which extends over the outside of the concrete wall. The upper water tank sides and water mains and connections are then installed, and the control and safety rod placed in their receptacles, connected to the exterior circuits and test operated.

With the control and safety rods inserted fully into the pile, the uranium rods are then inserted, as for example, by a crane operating from above ground, lowering each rod into place until all holes are filled.

Preliminary tests are then made of the chain reaction at low power output, with the circulating system in operation. When operating conditions are found to be satisfactory, the roof is closed over and covered with earth. To guard against helium leakage carrying radioactive fission fragments, the space between the reactor and the roof is well ventilated, preferably by blowers.

The system is then ready for operation at high powers. In the present instance, the power output is preferably stepped up a few thousand kilowatts a day, with all operating mechanism carefully checked, until the desired 100,000 kilowatts output is being obtained. The safety circuit B is then set to trip the safety rods at a 5% increase in neutron density over the steady output value, and thermostat 252 is set to trip the safety rods at 210° water temperature.

After 80–100 days of operation, sufficient fission products and $94^{239}$ have been produced in the center of the pile to warrant separation. The chain reaction is then shut down by inserting the control and safety rods, meanwhile maintaining full water circulation for a period at which time the spontaneous heating of the uranium will have been so reduced by radiation decay of the fission fragments, as to allow removal of the uranium without melting, under such cooling as may be obtained from the contact with the atmosphere.

Figure 8:
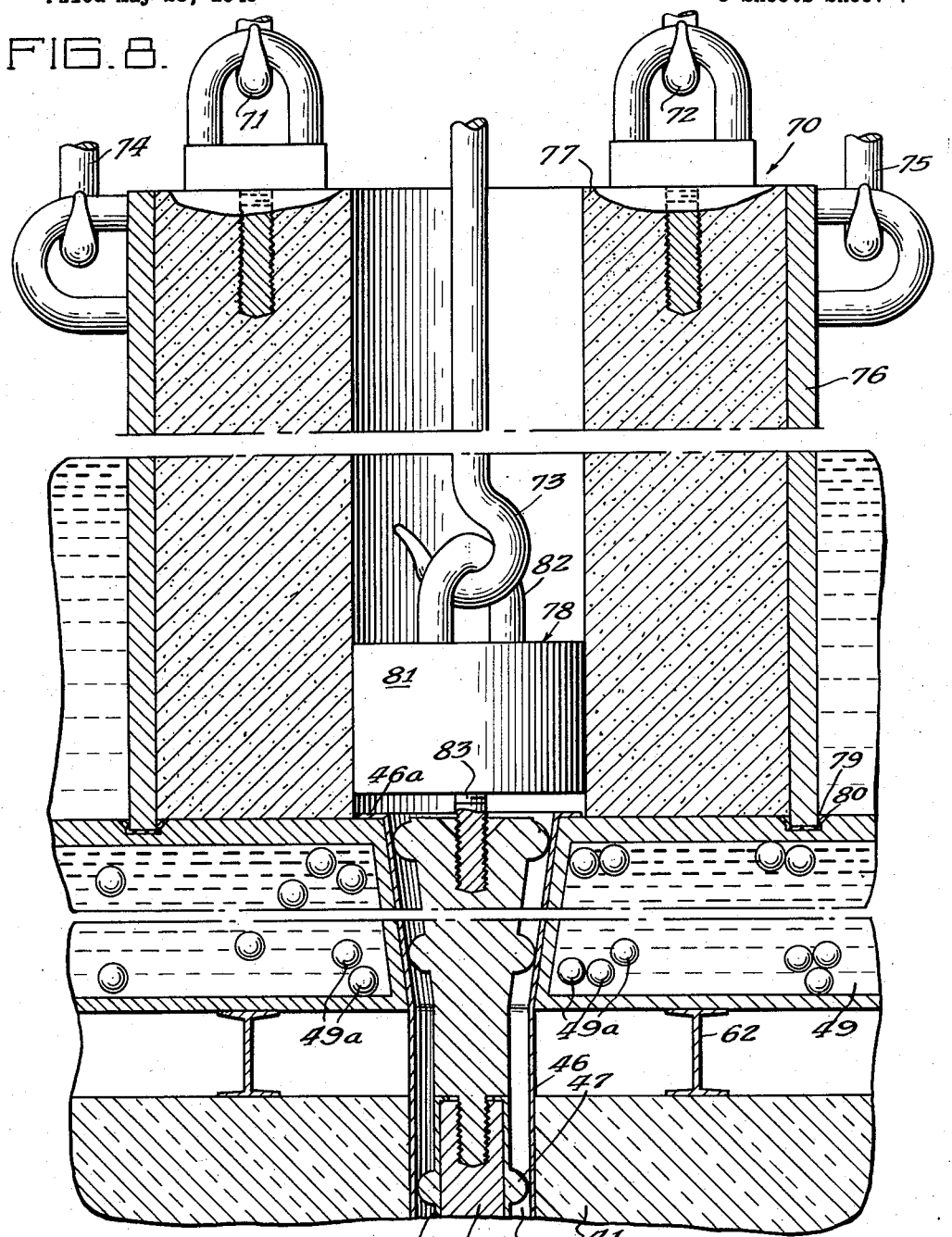
Fig. 8 is an enlarged fragmentary vertical sectional view taken through the reactor and showing partly in section and partly in elevation a cofferdam and lead shield mounted over one vertical tube.
Figure 9:
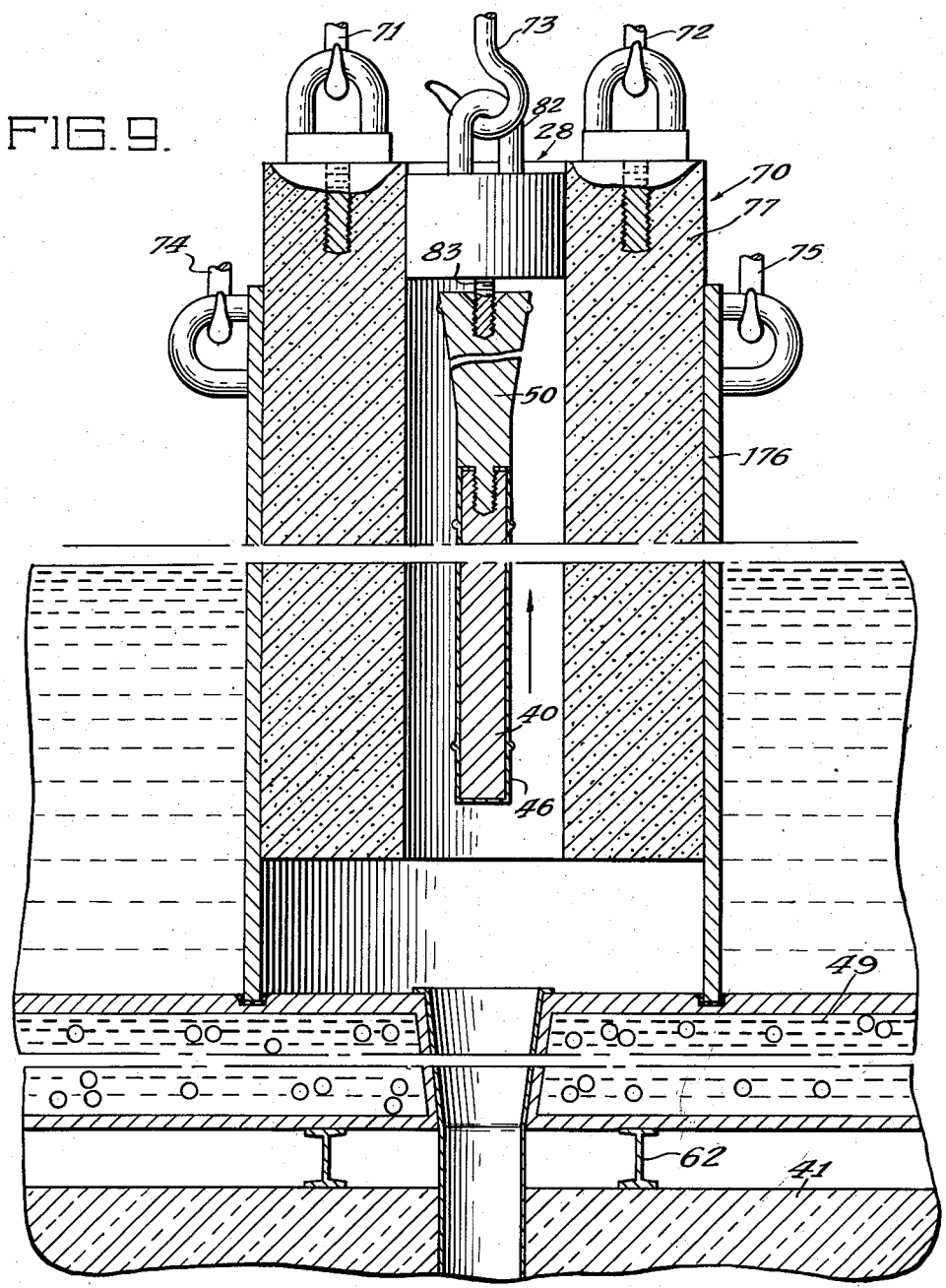
Fig. 9 is a view partly in elevation and partly in vertical section showing the cofferdam in place and illustrating the removal shield and one rod withdrawn from the reactor.

However, as the radioactivity still remaining in the rods is so great that they cannot be closely approached, they must be unloaded with full precautions for biological safety of the operating personnel. This is accomplished without halting the flow of coolant by means of the apparatus shown in Figs. 8 and 9. The earth and roof over the reactor are first removed, exposing the upper water tank 48. If a closed water tank is used the water flow is reduced and a segment of the top of the tank removed.

However, in the described reactor with the open tank, the water flow is only reduced slightly.

One means of removing the rods is a crane, not shown, operated from the ground surface, at one side of the opening. The crane may be provided with a long crane arm and lead shields so that operating personnel are protected from harmful radiation. A coffer dam assembly 70 supported in crane hooks 71, 72, 73, 74 and 75 is lowered over the top of the uranium rod 40 that is to be removed. The assembly 70 comprises a steel coffer dam 76, inside of which slides a lead coffin or removal shield 77 and inside of said coffin a rod removal tool 78. The assembly 70 may be lowered as a unit until the coffer dam 76 is resting on top of water tank 49 and centered in groove 79 that is concentric with the rod opening. A gasket 80 is positioned in groove 79 and the weight of the coffer dam 76 forces the bottom of said dam against said gasket making a water-tight joint.

The annular lead coffin 77 slides inside of coffer dam 76 and also rests on the water tank 49. The rod removal tool 78 has a cylindrical body 81 to the upper side of which is secured a ring 82. On the lower side of body 81 is a threaded member 83 adapted to screw into threaded socket 53 in plug 50. By turning hook 73 that is inserted in ring 82 the removal tool 78 is revolved until the threaded member 83 is screwed into threaded socket 53. At this time hook 73 is lifted upward carrying with it removal tool 78, plug 50 and rod 40, until the rod 40 is entirely surrounded by coffin 77. The coffin 77 and the rod 40 are then lifted together from coffer dam 76 and removed from the reactor to a position where the rod is dropped from the coffin 77 for further processing. A new uranium rod 40 and plug 50 are then pulled inside of coffin 77, the coffin is re-inserted in the coffer dam 76 and removal tool 78 is unscrewed from plug 50 leaving rod 40 suspended in the reactor in operating position. The coffer dam 76, coffin 77 and removal tool 78 are then lifted and moved to the next rod to be replaced and the process repeated. While the coffer dam is in place all the rods not surrounded by the dam are receiving the uninterrupted flow of coolant in normal amount since the coffer dam 76 prevents the evacuated hole or holes from filling with coolant. The use of the lead coffin protects the operating personnel from direct radiation of the "hot" uranium metal. It is of sufficient thickness that enough gamma radiation may be absorbed to make it safe for personnel to handle an irradiated rod in said coffin.

After the required rods are removed and replaced, the system is again placed in operation by replacing all parts and starting up the chain reaction. Systematic removal of rods in various radial zones of the pile is practiced so that the outer rods finally reach the required production of the end products.

Several important features of the system described herein should be noted, particularly the type of cooling arrangement, i. e., circulation of the cooling fluid around the outside of the uranium bodies between the uranium and the moderator. If greater cooling is desired this method may be combined with a method of internal cooling in which the uranium is in the form of tubes and the cooling fluid is circulated through a passage extending lengthwise through the center of the uranium bodies as well as through a passage between the uranium and the graphite.

As has been explained heretofore, the annulus of water around each uranium tube acts as a reflector to return some of the neutrons to the moderator instead of allowing them to enter the uranium. Therefore, a reactor using such cooling must be designed with sufficient excess maximum reproduction ratio $r$ to allow this loss of neutrons.

A cylindrical reactor using materials and geometry of the type described should have a maximum reproduction factor of about 1.073 without such impurities as aluminum covers 45, aluminum tubes 46 or water in the system. The losses in K due to these impurities are as follows:

1 mm. of Al in tubes 46=.0055W units
    1 mm. of Al in rod coverings=0.12 K units
    Water in the reactor=0.12 K units
    Other miscellaneous losses=.005 K units
        Total losses=0.0280 K units Thus when these losses are deducted from the maximum K, the value of K for the present reactor becomes 1.0730−0.028=1.045. A reproduction ratio of about 1.045 is considered desirable in neutronic reactor, because it allows ease of control. As is explained in the previous discussion of control rod action less than 1 percent of the neutrons are delayed. Therefore, the reproduction ratio should be kept below 1.1 in order that the control rod need only absorb a percentage of neutrons less than the percentage of delayed neutrons to reduce the reproduction ratio to unity.

Note that the water loss of 0.012 $r$ units is the greatest loss of those listed. However, by means of our invention using materials of high purity and the proper geometry, this loss may be overcome and a neutronic chain reaction is achieved.

In this description reference has been made primarily to water as the coolant for the pile. Diphenyl, also known as biphenyl or phenylbenzene, serves as another satisfactory coolant. This substance has the chemical formula $C_6H_5C_6H_5$ and is in the form of a solid at atmospheric temperature, melts at 70° C., and has a boiling point of 255° C. Thus the operating temperatures of a pile cooled with diphenyl can be higher than that for a pile using water.

Diphenyl has a lower absorption of thermal neutrons than has water. For example, a loss of neutrons by absorption due to a diphenyl cooling layer 4 millimeters thick corresponds to the loss due to a 2.2 millimeter layer of water. Thus for the same reproduction ratio almost twice as much diphenyl as water can be circulated through the pile. The cooling passages then, for a pile employing diphenyl can be almost twice as wide as those set forth for the water passage. About 10 percent to 15 percent more pumping power is required to circulate the diphenyl due to its greater viscosity, and since diphenyl solidifies at 70° C. special measures are taken to prevent freezing of the coolant while it is disposed in the portion of the cooling circuit outside the pile. This can be done by maintaining the temperature of the diphenyl at all times safely above 70° C. while being circulated.

In addition, the use of helium in the pile offers many advantages. The neutron absorption of pure helium is negligible, and as heretofore pointed out it promotes heat exchange in the pile. The use of helium, however, has another advantage as it replaces the nitrogen that normally would permeate a pile exposed to the atmosphere. Nitrogen has a definite neutron absorption factor and consequently any nitrogen absorption of neutrons to the detriment of the chain reaction is prevented when helium is used. Furthermore, the nitrogen density in a pile exposed to the atmosphere changes with atmospheric pressure, and any such change causes change in the reproduction ratio of the pile, requiring correction by the control rods. Consequently, a sealed pile containing helium is immune to changes in atmospheric pressure. Again, the argon content of ambient air becomes highly radioactive with neutron bombardment. Such radioactive argon diffuses out of a pile exposed to the atmosphere and becomes a biological hazard. Such a condition does not occur in the helium filled pile described herein.

Other advantages of the invention set forth in the specification and attached claims will be apparent to those skilled in the art.

During the operation of the neutronic reactor particularly at high neutron densities radioactive elements of exceedingly high capture cross section may be formed in the uranium as an intermediate element in the decay chains of fission fragments and this formation will lower the value of the reproduction factor for the system. Radioactive xenon$^{135}$ is an example of such an intermediate element, this product having a half life of about 9 hours and being formed mostly from radioactive iodine which has a half life of about 6.6 hours and decays to barium. There should be sufficient excess in the reproduction ratio of the reactor so that in the event the reproduction factor is reduced as a result of the formation of an intermediate decay element having a high capture cross section for neutrons the control rods may be withdrawn sufficiently to maintain the reproduction ratio at a value of unity while maintaining the power output at the desired level. It might be desirable to initially construct the reactor sufficiently over-sized to supply this excess reproduction ratio when needed and in this event removable impurities for example in the form of additional shim or control rods may be initially placed in the reactor and kept there at all times until the reproduction ratio commences to fall as the result of the formation of these intermediate decay elements.

While the theory of the nuclear chain fission mechanism in the uranium set forth herein is based on the best presently known experimental evidence, it is not intended that the present inventors be bound thereby, as additional experimental data later discovered may modify the theory disclosed. Any such modification of theories, however, will in no way effect the results to be obtained in the practice of the invention herein discovered and claimed.

What is claimed is:

1. In a neutronic reactor having vertically disposed rods of thermal neutron fissionable material and having a chamber of liquid coolant surrounding the top ends of said rods, the improvement comprising a coffer dam sleeve sealable to the floor of the chamber in positions surrounding the ends of the rods, a radiation shield sleeve disposed in and vertically reciprocable through the coffer dam sleeve, and an engaging member disposed in and reciprocable axially of the radiation shield and adapted to engage a rod, whereby the coffer dam may be placed over the end of a rod, the rod withdrawn into the shield, and the shield and rod removed.

2. In a neutronic reactor having rods of thermal neutron fissionable material and having a chamber of liquid coolant surrounding the ends of said rods, the improvement comprising a coffer dam sleeve sealable to the chamber in positions surrounding the ends of the rods, a radiation shield sleeve disposed in and reciprocable through the coffer dam sleeve, and an engaging member disposed in and reciprocable axially of the radiation shield and adapted to engage a rod, whereby the coffer dam may be placed over the end of a rod, the rod withdrawn into the shield, and the shield and rod removed.

References Cited in the file of this patent

UNITED STATES PATENTS

| | | |
|---|---|---|
| 92,324 | Lewis | July 6, 1869 |
| 367,547 | Poetsch | Aug. 2, 1887 |
| 860,391 | Lea | July 16, 1907 |

FOREIGN PATENTS

| | | |
|---|---|---|
| 114,150 | Australia | May 2, 1940 |
| 861,390 | France | Oct. 28, 1940 |
| 233,011 | Switzerland | Oct. 2, 1944 |

OTHER REFERENCES

Smyth: "Atomic Energy for Military Purposes," pp. 103–104, August 1945. Copy may be purchased from Supt. of Doc., Washington, D. C.

Kelly et al.: Phy. Rev. 73, 1135–9 (1948). Copy in Patent Office Library.